June 2, 1959  T. E. NOAKES  2,889,431
DUAL TEMPERATURE INFINITELY VARIABLE THERMOSTATIC SWITCH
Filed Nov. 1, 1957
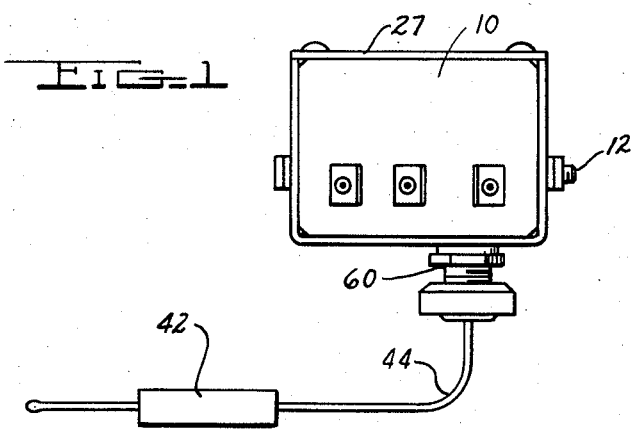
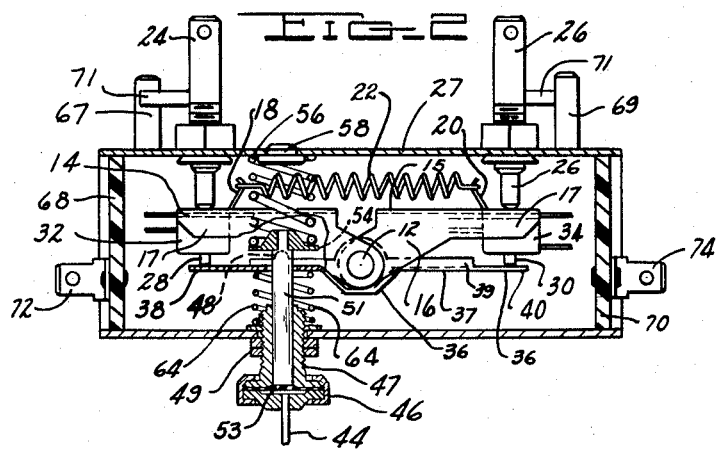
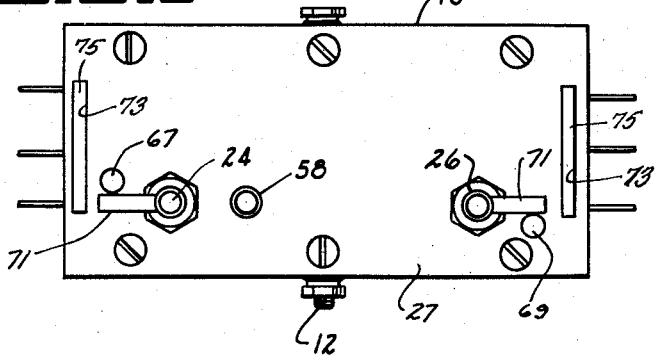
INVENTOR
THOMAS EDMUND NOAKES
SMITH, WILSON, LEWIS & McRAE
ATTORNEYS

United States Patent Office 2,889,431
Patented June 2, 1959

2,889,431

DUAL TEMPERATURE INFINITELY VARIABLE THERMOSTATIC SWITCH

Thomas Edmund Noakes, Detroit, Mich., assignor to American Radiator & Standard Sanitary Corporation, New York, N.Y., a corporation of Delaware Application November 1, 1957, Serial No. 693,891

8 Claims. (Cl. 200—140)

This invention relates to switches operated by temperature responsive means, more particularly to a dual switch mechanism actuated by a single temperature sensing element to control each switch element within predetermined temperature ranges.

In the operation of certain mechanisms, such for example as devices in the household appliance field, it is desirable to sequentially operate devices within different temperature ranges. An example of such an operation is the control system for automatic washers in the home laundry field. In this field it is desirable that successively operable cycles such for example, as soaking and washing cycles be carried out within different temperature ranges. Generally similar problems are encountered in the heating and cooling arts, where furnaces and air conditioning devices are employed to either heat or cool an area.

An object of my invention is to provide a dual switch mechanism actuated by a temperature sensing device and controlled by an adjustable toggle to provide independent control of devices operating within predetermined temperature ranges.

A further object of my invention resides in the provision of a dual switch mechanism wherein selectively operable control members are provided to vary the temperature range within which a pair of switches will be operative.

Another object of my invention is to provide a dual temperature operated switch mechanism wherein the switches are controlled from a remote temperature sensing device to provide successive actuation of electric switches, dependent on the relative positions of selectively operable control members.

Still a further object of my invention is to provide an improved switch actuating mechanism having an operating lever yieldingly urged in opposite directions by opposed springs of different forces, and wherein the force exerted by a temperature responsive device positioned at a remote point is employed to oppose the force exerted by the stronger spring to vary the balance of forces exerted by the oppositely acting springs to provide switch operation dependent on the force exerted by the temperature sensing device.

Yet a further object of my invention is to provide a simplified dual switch mechanism which can be manufactured economically.

Other objects and advantages of this invention will be apparent from the following detailed description, considered in connection with the accompanying drawings submitted for purposes of illustrations only and not intended to define the scope of the invention, reference being had for that purpose to the subjoined claims.

In the drawings wherein similar reference characters refer to similar parts throughout the several views.

Fig. 1 is a side elevational view of my improved dual switch mechanism embodying my invention.

Fig. 2 is a sectional view, partly in elevation, of the control mechanism illustrated in Fig. 1.

Fig. 3 is a plan view of the device illustrated in Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to Fig. 1 it will be observed that my improved temperature responsive dual switch mechanism is housed within a casing 10 having a shaft 12 mounted substantially centrally therein. As illustrated in Fig. 2 oppositely directed switch carrying arms 14 and 16 are journaled on shaft 12. Each of arms 14 and 16 includes a web 15 and flanges 17. Sections of webs 15 are turned upwardly at 18 and 20 to form ears for connection with opposite ends of a tension spring 22. Spring 22 yieldingly urges the arms 14 and 16 angularly upward about the axis of shaft 12 to maintain contact between the outer ends of the levers and adjusting screws 24 and 26 journaled in the cover plate 27 of casing 10. It will be noted that the angular position of each of the arms 14 and 16 may be raised or lowered by manipulation of its associated adjusting screw 24 or 26 respectively.

Switch-actuating trigger devices such for example as the switch operating pins 28 and 30 are carried by switches 32 and 34 fixedly mounted on the levers 14 and 16.

A switch-operating lever 36 is mounted for oscillation in opposite directions about shaft 12. Lever 36 includes a web 37 and upstanding flanges 39 which are provided with circular openings for rockably mounting the lever on shaft 12. End portions 38 and 40 of lever 36 underlie the switch-operating pins 28 and 30 to actuate the switches 32 and 34 respectively.

A temperature sensing device 42 containing thermally expansible material is operably connected through capillary tube 44 to a casing 46 adjustably positioned on the bottom wall of casing 10. Casing 46 includes an exteriorly threaded guide sleeve 47 which is adjustably clamped onto casing 10 by means of lock nuts 49. Guide sleeve 47 slidably mounts a piston 51, which overlies a diaphragm 53. Operation of the mechanism is such that when the temperature of thermal bulb 42 is increased the liquid in capillary tube 44 is forced upwardly against diaphragm 53 in a manner to drive piston 51 upwardly in sleeve 47.

The upper end of piston 51 fixedly carries a saddle 54 which forms a seat for compression spring 56. In operation, when the temperature of bulb 42 is decreased spring 56 serves to drive piston 51 downwardly in accordance with the amount of contraction experienced in the thermal bulb. A headed plug 58 is pressed into an opening in wall 27 to correctly seat the upper end of spring 56.

Piston 51 freely extends through an opening in web portion 37 so as not to interfere with rocking movement of lever 36. Each of flanges 39 is provided with an arcuately formed projecting section 48 which engages the undersurface of saddle 54. A compression spring 64 maintains lever 36 in engagement with the saddle. Spring 64 is calibrated to be weaker than spring 56, but it exerts a sufficient force on lever 36 to rock the lever on the shaft 12 for actuation of the left hand switch 32 when the force exerted by the temperature sensing device 42 overcomes or neutralizes the downward force exerted by the upper actuating spring 56. As explained above this happens when the temperature sensing bulb 42 is subjected to an increase in temperature. When bulb 42 is cooled spring 56 becomes effective to pivot lever 36 counterclockwise so as to actuate switch 34.

It will be noted that spring 22 maintains the switch-carrying levers 14 and 16 in contact with the adjusting screws 24 and 26 at all times. By loosening or raising the left hand adjusting screw 24 it will be noted that the arm 14 (and with it the switch actuating pin 28 of the left hand switch 32) will be elevated and that it will therefore be necessary for the temperature sensing device 42 to reach a higher temperature before the switch 32 will be actuated.

Conversely it will be noted that by elevating or raising the right hand adjusting screw 26, the lever 16 and right hand switch 34 will be oscillated in the counterclockwise direction about the shaft 12. As the temperature responsive device 42 heats up lever 36 will be separated from pin 30 of the right hand switch 34 at an earlier stage in the operation of the device whereupon the release or disengagement of the right hand switch 34 will occur at a lower temperature of the temperature responsive element 42.

For example the left hand switch may be adjusted to operate within a temperature range of 100° F. to 150° F., with the right hand switch operating within a temperature range of 50° F. to 100° F., the operation being infinitely variable within the selected range. By suitably manipulating the adjusting screws 24 and 26 the switches 32 and 34 can be rendered operable within widely varying temperature ranges.

Pins 67 and 69 are secured in fixed positions on casing top wall 27. After screws 24 and 26 have been turned to their properly calibrated positions pins 71 may be extended through horizontal openings in the screws so as to prevent such inadvertent turning of the screws as would destroy the calibration.

The end walls 68 and 70 of casing 10 are formed of dielectric material so as to act as terminal boards for terminals 72 and 74. Leads (not shown) operably connect terminals 72 and 74 to the respective switches 32 and 34. The terminals 72 and 74 are in turn connected to the devices which it is desired to control by my improved switch mechanism. Securement of the terminal boards 68 and 70 is effected by forming them with upwardly projecting extensions 75 which fit within slots 73 formed in cover plate 27.

I claim:

1. In a mechanism for actuating sequentially operable devices, a shaft, oppositely directed levers pivotally mounted on said shaft, a switch carried by each of said levers, adjusting screws controlling the angular position of each of said levers, yielding means urging the levers into engagement with said adjusting screws, trigger means for actuating each of said switches, a switch operating lever oscillatingly associated with said shaft and movable angularly in opposite directions to actuate said trigger means, a first yielding means urging the switch operating lever in one direction to actuate the trigger means associated with one of said switches, a second yielding means to overcome the force exerted by said first yielding means and to urge the switch operating lever in the opposite direction to actuate the trigger means associated with the other of said switches, a temperature sensing element, and force transmitting means between the temperature sensing element and said second yielding means to control said switches proportionately to variations of temperature to which said temperature sensing element is subjected.

2. A dual switch mechanism comprising a shaft, oppositely directed levers pivotally mounted on said shaft, a switch carried by each of said levers, trigger means for actuating each of said switches, a switch operating lever oscillatingly associated with said shaft and movable angularly in opposite directions to actuate said trigger means, a first yielding means urging the switch operating lever in one direction to actuate the trigger means associated with one of said switches, a second yielding means to overcome the force exerted by the first yielding means and to urge the switch operating lever in the opposite direction to actuate the trigger means associated with the other of said switches, and force transmitting means to exert a force on the second yielding means.

3. An adjustable mechanism for actuating sequentially actuating separately operable devices comprising a shaft, oppositely directed switch carrying levers pivotally mounted on said shaft, trigger means for actuating each of the switches, a switch operating lever oscillatingly associated with said shaft and movable angularly in opposite directions to actuate said trigger means, adjusting screws controlling the angular position to which each of said levers can move, yielding means urging the levers into engagement with said adjusting screws, a first yielding means urging the switch operating lever in one direction to actuate the trigger means associated with one of said switches, a second yielding means to oppose the force exerted by said first yielding means and to urge the switch operating lever in the opposite direction to actuate the trigger means associated with the other of said switches, a temperature sensing element, force transmitting means between the temperature sensing element and the second yielding means to control said switches proportionately to variations of temperature to which the temperature sensing element is subjected, the adjusting means associated with one of the switch carrying levers functioning when actuated to increase the temperature at which said switches are operated and the adjusting means associated with the other of the switch carrying levers functioning when actuated to decrease the temperature at which said switches are operated.

4. In a switch mechanism for actuating sequentially operable devices, a shaft, oppositely directed levers pivotally mounted on said shaft, a switch carried by each of said levers, an adjusting screw controlling the angular position to which each of said levers can move, yielding means urging the levers into engagement with said adjusting screws, trigger means for actuating each of said switches, a switch operating lever oscillatingly associated with said shaft and movable angularly in opposite directions to actuate said trigger means, a first yielding means urging the switch operating lever in one direction to actuate the trigger means associated with one of said switches, a second yielding means opposing the force exerted by the first yielding means and operable through a one-way driving connection to urge the switch operating lever in the opposite direction to activate the trigger means associated with the other of said switches, and force transmitting means controlling the second yielding means.

5. In a control mechanism a pair of angularly movable arms, a switch carried by each of said arms, a switch actuating lever angularly movable relative to the switch carrying arms, trigger means between each of said switches and the said switch actuating lever, a first force transmitting means urging the switch actuating lever to actuate the trigger means of one of said switches, and a second force transmitting means opposing the first mentioned force transmitting means urging the switch actuating lever to actuate the trigger means of the other of said switches.

6. The combination comprising two independently movable support structures; a switch carried on each of said support structures; a reciprocable force member movable during one portion of its movement to operate one of the switches, and movable during another portion of its movement to operate the other switch; and a separate adjustment mechanism operably engaged with each of said support structures for independently adjusting the position of each switch relative to the force member.

7. The combination comprising two independently movable levers; a switch carried on each of said levers; a reciprocable force member movable during one portion of its movement to operate one of the switches, and movable during another portion of its movement to operate the other switch; condition responsive power means operably connected with said force member for effecting its reciprocable movement; and a separate adjustment mechanism engaged with each of said levers for independently adjusting the position of each switch relative to the force member.

8. The combination comprising a casing having openings adjacent its opposite ends; a terminal board extending across each one of the openings; two independently adjustable support structures within the casing; one of said support structures extending into the space adjacent one terminal board, and the other support structure extending into the space adjacent the other terminal board; a switch carried on each support structure; electrical connections between each switch and its immediately adjacent terminal board; and a reciprocable force member within said casing, movable during one portion of its movement to operate one of the switches, and movable during another portion of its movement to operate the other switch.

References Cited in the file of this patent

UNITED STATES PATENTS

| | | |
|---|---|---|
| 2,520,370 | Offutt | Aug. 29, 1950 |
| 2,620,414 | Thorsheim | Dec. 2, 1952 |
| 2,788,416 | Kilbury | Apr. 9, 1957 |
| 2,804,525 | Mantz | Aug. 27, 1957 |